Figure 1:
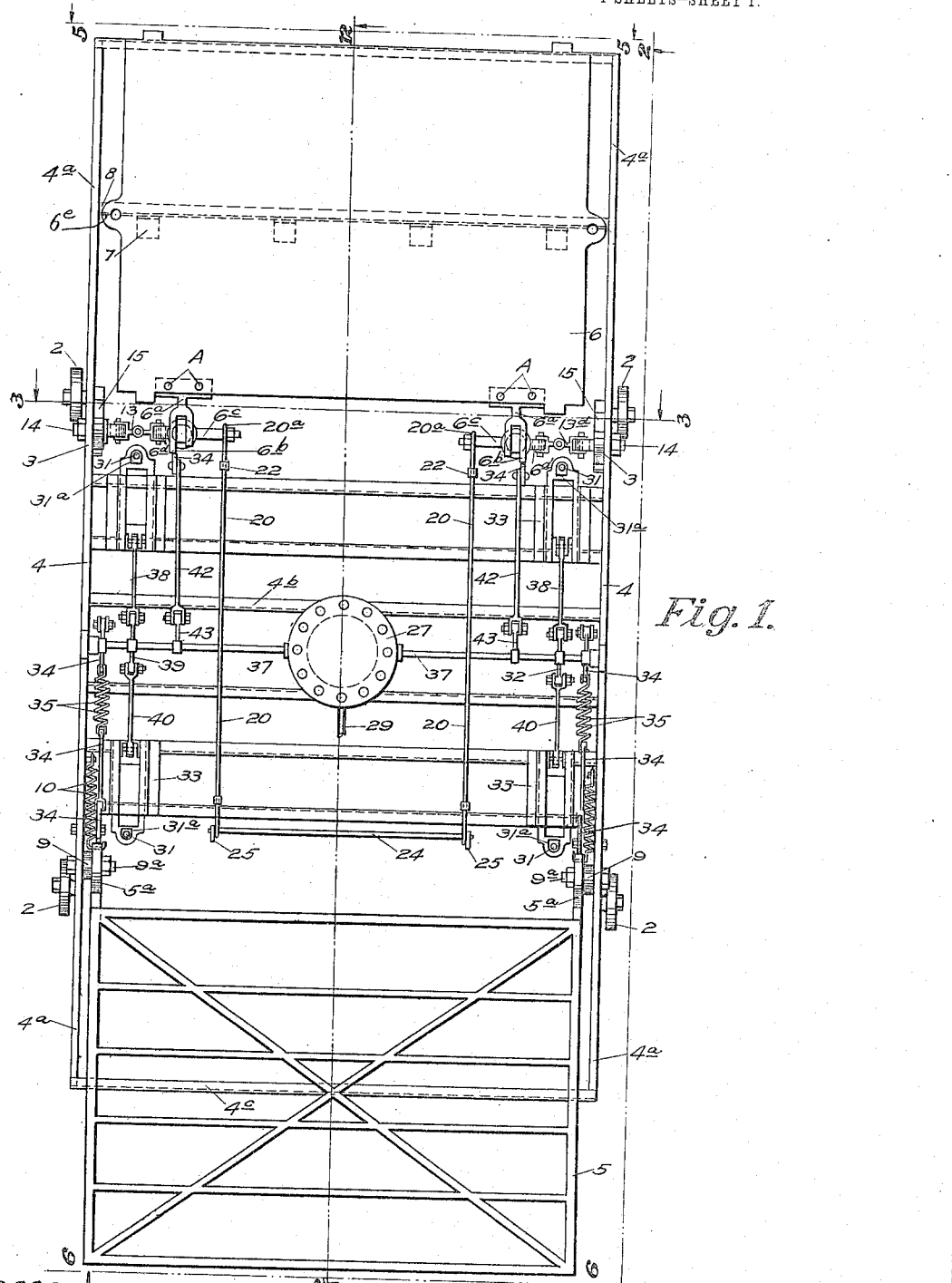

W. C. LANG.
MOLD MAKING MACHINE.
APPLICATION FILED MAY 28, 1914.
1,131,145.
Patented Mar. 9, 1915.
4 SHEETS—SHEET 2.
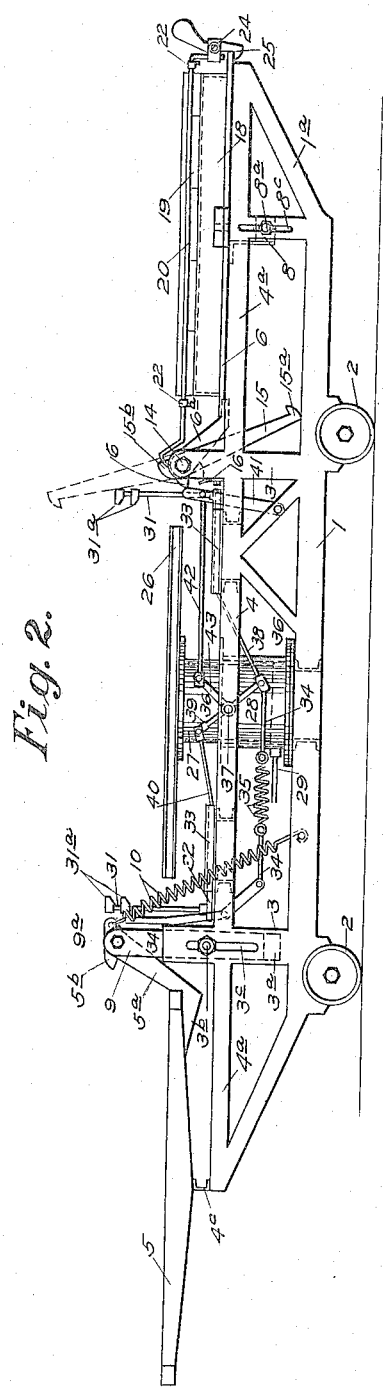
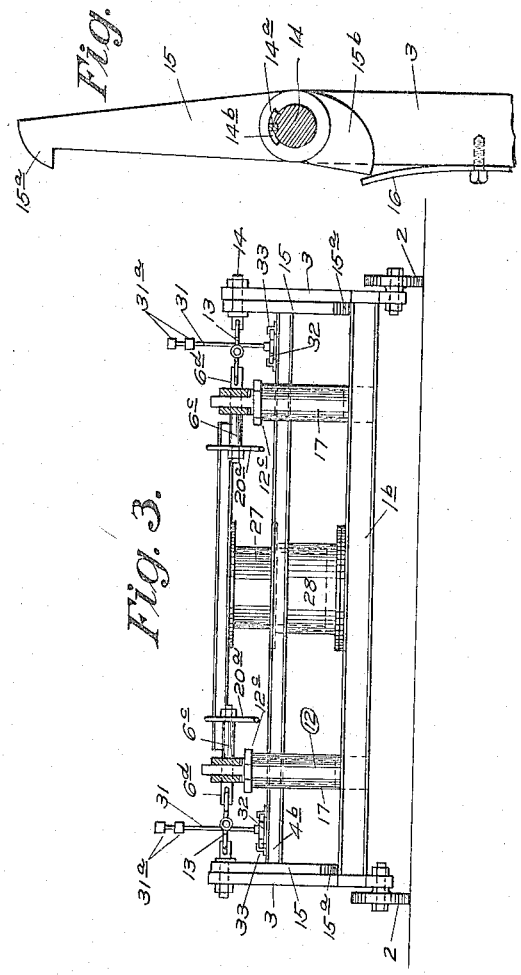
Witnesses
A. D. Schrader
Edw. Lindmueller
Inventor Wm. C. Lang
By Obed C. Billman Att'y.

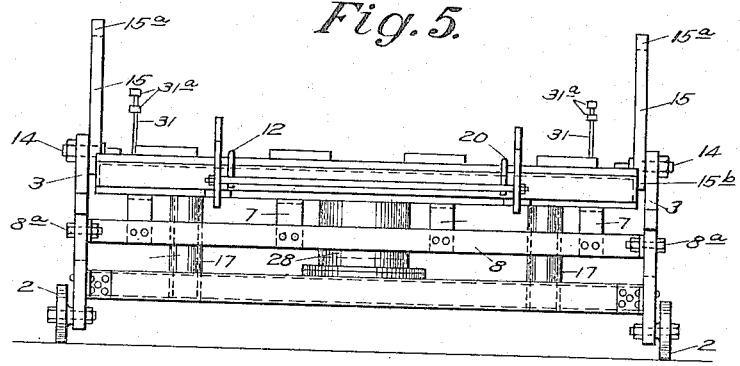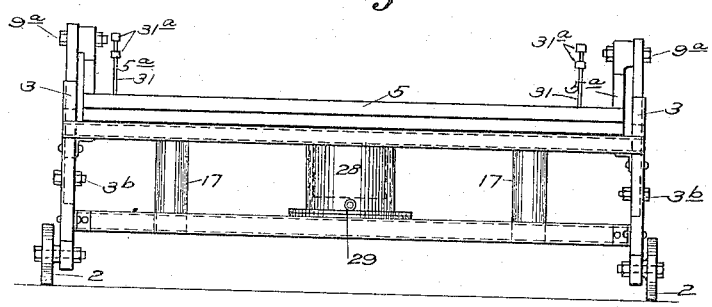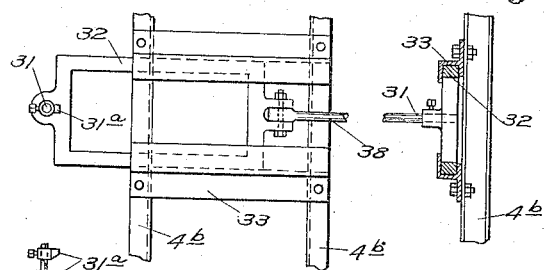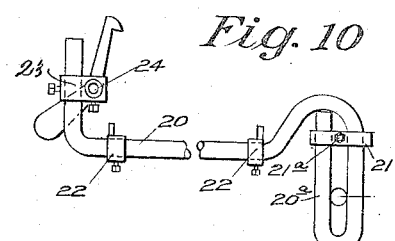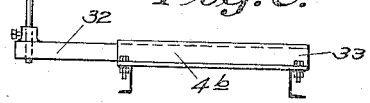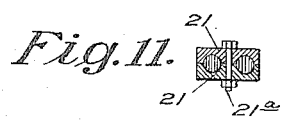

W. C. LANG.
MOLD MAKING MACHINE.
APPLICATION FILED MAY 28, 1914.
1,131,145.
Patented Mar. 9, 1915.
4 SHEETS—SHEET 4.
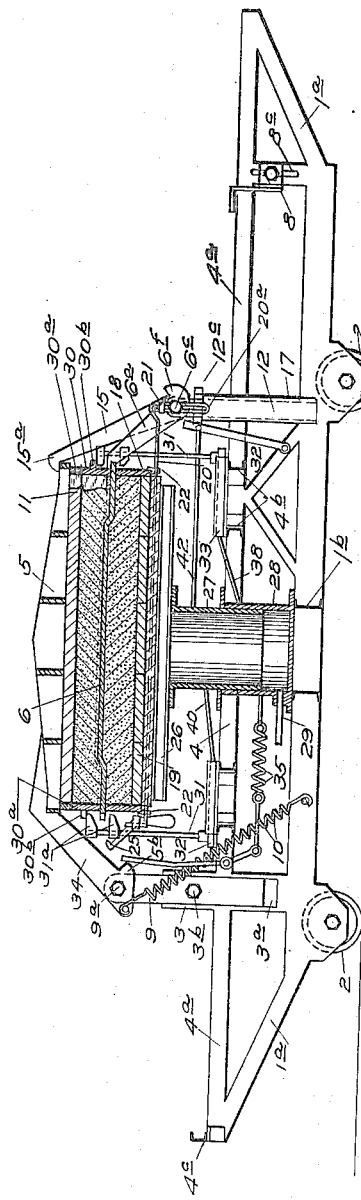
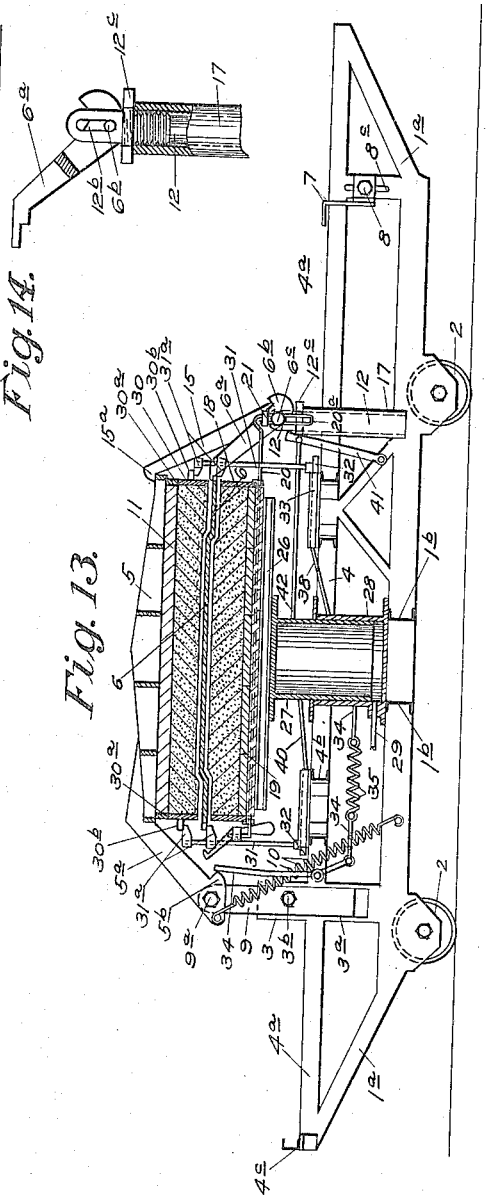
Witnesses
A. D. Schrader
Edw. Lindmueller
Inventor Wm. C. Lang
Fred C. Billman Atty.

UNITED STATES PATENT OFFICE.

WILLIAM C. LANG, OF CLEVELAND, OHIO.

MOLD-MAKING MACHINE.

1,131,145.   Specification of Letters Patent.   Patented Mar. 9, 1915.

Application filed May 28, 1914. Serial No. 841,461.

*To all whom it may concern:*

Be it known that I, WILLIAM C. LANG, a citizen of the United States, residing at Cleveland, in the county of Cuyahoga and State of Ohio, have invented certain new and useful Improvements in Mold-Making Machines, of which the following is a specification.

My invention relates to improvements in mold making machines, and is particularly designed and adapted for receiving, supporting and handling of the respective flask-sections together with the head and base boards and the pattern-plate and the filling or compressing or "ramming" of the molding sand in the act of forming a complete mold.

The primary object of the invention is to provide a generally improved machine of this class of exceedingly simple, cheap, and efficient construction in which the various parts may be readily adjusted to meet the varying demands of actual service.

A further object is to facilitate the handling of the various parts necessary to form a complete mold as well as provide a machine of this class adapted to receive and properly handle pattern-plates and flask-sections of varying thicknesses employed in making molds of varying forms.

A still further object is to provide improved means for holding the flask-sections and other parts in proper superposed relation to each other while the flask contents are being compressed as well as providing improved means for completely and uniformly compressing the cope and drag sections of the complete mold.

A still further object is the provision of improved means for engaging, supporting and separating the different mold forming parts during and upon the completion of the compressing operation.

A still further object is the provision of an improved auxiliary or supplementary cope flask-section superposed above and coöperating with the main upper or cope flask-section and adapted to facilitate the "striking-off" or leveling of the main cope section when the head is removed.

With the above mentioned, and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a top plan view of the improved mold making machine, the pattern-plate being attached and the vertically movable mold compressing table being removed for the purpose of clearer illustration of the parts. Fig. 2, a side elevation taken on line 2—2 of Fig. 1 the lower or drag section of the mold and base board being in an inverted position over the pattern-plate and held in such partially assembled position preparatory to being swung over into proper upright position on the mold compressing table to receive the superposed upper or cope section of the mold. Fig. 3, a cross sectional view taken on line 3—3 of Fig. 1. Fig. 4, an enlarged detail view of one of the upper head carrier latching or engaging members in its upper or operative position as so carried by the reversing movement of the pattern-plate and lower flask section over and in proper position upon the mold compressing table preparatory to receiving the upper flask or cope section and said head carrier, and for latching the latter before the upward or compressing movement of the compressing table in the act of compressing the molding sand in said flask sections. Fig. 5, an end elevation taken on line 5—5 of Fig. 1. Fig. 6, an end elevation taken on line 6—6 of Fig. 1. Fig. 7, a detached detail top plan view of one of the slidably mounted pattern-plate and upper flask engaging and separating members for automatically supporting and separating said members after the mold compressing operation. Fig. 8, a side elevation of the same. Fig. 9, a cross sectional view of the same. Fig. 10, a detached detailed side elevation of one of the latching members for locking or latching the pattern-plate and superposed inverted lower flask section and base board in assembling preparatory to and while being swung to proper upright position over and above the compressing table. Fig. 11, a sectional view of the hinged base portion thereof showing the adjustable bearing clip for varying the play of the hinged portion thereof and allowing an upward movement of the latter during the upward movement of the mold bottom or base board in the compressing operation. Fig. 12, a central cross sectional view taken on line 12—12 of Fig. 1, the mold sections being in proper superposed relation above the compressing table preparatory to being compressed, and the latching or locking members being in engagement with the free edge of the pivoted head carrier whereby the latter is held in a true horizontal position during the compressing act. Fig. 13, a similar view showing the released or depressed position of the compressing table, and the separation and support of the upper flask-section and pattern-plate in horizontal and parallel relation to each other by the supporting and separating devices. Fig. 14, an enlarged side elevation partly in section of one of the pivoted pattern-plate carriers showing the arrangement whereby a limited movement of the pivoted portion thereof is permitted to compensate for the movement of the pattern-plate during the compressing operation as illustrated in Fig. 12 and the release and separation of the parts as shown in Fig. 13 of the drawings.

Similar numerals of reference designate like parts throughout all the figures of the drawings.

The improved machine comprises a suitable frame, in the present instance, comprising a base section 1, mounted on suitable wheels 2, and provided with vertical bearing posts 3, connected to and supporting a second horizontally extending section 4, said second section including extensions 4$^a$, extending beyond the posts or bearing columns 3. The extensions 4$^a$, are braced or supported by means of brace members 1$^a$, and are adapted to normally support a pivoted head carrier 5, on one side and a suitable pattern-plate 6, on the other.

The base section 1, may be connected by means of channel members 1$^b$, and the upper section 4, may be similarly connected and braced by means of channel members 4$^b$.

The head carrier 5, when in its inverted position may be supported throughout its central portion by means of a transverse member 4$^c$, and the pattern-plate 6, may be similarly supported by means of a series of brackets 7, carried upon a transverse bar 8, the latter being adjustably mounted through the medium of adjusting bolts 8$^a$, in slots 8$^c$, in the vertical portions of the extension 4$^a$. The head carrier 5, is provided with inclined arms 5$^a$, pivotally connected to bearing posts or columns 9, through the medium of pivot bolts 9$^a$, and as a means of adjusting the bearing portions of the arms 5$^a$, whereby the head carrier 5, may be adjusted to accommodate flask-sections of varying thickness said bearing posts are mounted in guideways 3$^a$, of the posts 3, and are adapted to be adjusted through the medium of adjusting bolts 3$^b$, mounted in guide slots 3$^c$, as shown most clearly in Fig. 2 of the drawings. As a means of counterbalancing the weight of the pivoted head carrier 5, in its respective positions as well as facilitating its movements to and from said positions, counter-balancing coiled springs 10, are provided, said carrier 5, being adjustably braced and being adapted to receive and carry a suitable head or board 11. The inclined arms 5$^a$, carrying the head carrier 5, are also provided with cam members 5$^b$, for automatically actuating said pattern-plate and upper flask engaging and separating devices as hereinafter described.

The pattern-plate 6, is detachably connected to and carried by a pair of hinged pattern carriers 6$^a$, said pattern carriers being detachably secured to one edge of the pattern-plate by means of bolts A, or other securing elements, said carriers 6$^a$, being hingedly connected to the bearing posts 12, through the medium of bearing pins 6$^b$, (see Fig. 14) adapted to have a vertical movement in bearing guide slots 12$^b$, of the bearing heads of the posts 12, whereby a limited movement of the pattern carriers will be permitted during the mold compressing operation as hereinafter more fully described. The bolts 6$^b$, are connected to and are adapted to be rotated by the actuation of the pattern carriers and are provided on one side with guide extensions 6$^c$, and at the other with heads 6$^d$, connected to links 13, which latter are connected to bearing bolts 14, mounted in the bearing posts 3, said bearing bolts 14, carrying latching levers or members 15, terminating in beveled hooked heads 15$^a$. By reason of the construction described when the pattern carriers 6$^a$, and attached pattern 6, together with the inverted superposed lower flask-section and baseboard are swung from the position shown in Fig. 2 to the position shown in Fig. 12, the latching levers or members 15, will be swung to the upright positions indicated by dotted lines in Fig. 2 and in full lines in Fig. 4, and as a means for causing said latch levers to be held inwardly for automatically engaging with the free edge of the head carrier 5, when the latter is swung to the position shown in Fig. 12, said latching or locking members 15, are provided with extensions 15$^b$, adapted when swung upwardly to come into engagement with and compress flat springs 16, as shown most clearly in Figs. 2 and 4 of the drawings, and as a means for permitting said latching or locking members to have a limited free movement on the bearing bolts 14, the latter are provided with key members 14$^a$, adapted to slide in groove-ways 14$^b$, as shown most clearly in Fig. 4 of the drawings, it being apparent that when the beveled heads 15$^a$, are engaged by the free edge of the head carrier 5, and moved out of the dotted line position shown in Fig. 2 to the position indicated in full lines in Fig. 4 that the springs 16, will automatically throw the latch members into engagement with the head carrier 5, as shown in Figs. 12 and 13.

The bearing posts 12, are mounted in vertical guide-sleeves 17, and are adapted to be adjusted vertically through the medium of adjusting nuts 12ᶜ, whereby the pattern carriers 6ᵃ, may be adjusted to conform to patterns and flask-sections of varying thicknesses.

When it is desired to form a mold, the pattern-plate 6, is first attached to the hinged carrier 6ᵃ, and mounted in the position shown in Figs. 1 and 2 of the drawings. The lower flask-section 18, is then mounted in its inverted position upon the pattern-plate as shown in Fig. 2 of the drawings and filled with molding sand after which the base board or mold bottom 19, is placed thereon. As a means of locking or latching the pattern-plate and superposed inverted lower flask-section and base board in the position just described, a pair of rods 20, are provided said rods terminating at their base portions in elongated guide loops 20ᵃ, (see Figs. 10 and 13) adapted to slide upon the ends of the bolt extensions 6ᶜ, and being adapted to have a limited movement thereon through the medium of adjustable bearing clips 21, the latter being secured by means of clamping bolts 21ᵃ. By adjusting the clamping clips 21, the play of the pivoted portions of the rods 20, may be varied in accordance with the thickness of the pattern-plates and flask-sections. The retaining rods 20, are adapted to be swung outwardly over the base board 19, shown in Fig. 2 and are provided with adjustably mounted clamp members 22 adapted to engage on opposite sides of the lower flask-section as shown and the free ends of the bars or rods 20, are provided with angular extensions carrying adjustably mounted clips 23, provided with a cross bar 24, the latter carrying a pair of counter-balanced latches 25, which latter are adapted to be snapped into engagement with the free edge of the pattern-plate as shown in Fig. 2 for holding the parts as shown in proper relative position preparatory to and during the swinging of the lower flask-section to proper position upon the compressing table 26, as shown in Fig. 12 of the drawings.

The compressing table 26, is mounted on a piston plunger section 27, carried within a cylinder 28, which cylinder 28, is adapted to be supplied with a suitable operating fluid such as air or the like, through the medium of a conduit pipe 29. The upper flask-section 30, may then be superposed above the pattern-plate 6, and filled with sand after which my improved auxiliary or supplementary upper or cope forming flask-section 30ᵃ, may be properly mounted and filled with sand and struck off and the head board 11, placed in position together with the head carrier 5, the latching levers 15, automatically engaging with the free edge of said carrier 5, as shown in Fig. 12 and as hereinbefore explained.

As a means of engaging and supporting the upper flask-section 30, in its proper position as shown in Fig. 12, as well as for engaging and separating said section, together with the pattern-plate as shown in Fig. 13, when the pressure of the operating fluid is released from the cylinder carrying the compressing table, vertically extending supporting bars 31, are provided, said bars being mounted in supporting plates 32, slidably mounted in guide-ways 33, and as a means for actuating or drawing said supporting bars 31, toward each other and holding the same in such position when the pivoted head carrier 5, is in the position shown in Figs. 12 and 13, a pair of levers 34, are pivotally mounted at each side of the frame so that the upper or free ends thereof will be engaged and actuated by the cam members 5ᵇ, of the arms 5ᵃ, of the head carrier as shown, said levers being connected at their lower ends to links 34, and spring links 35, connected to crank arms 36, the latter being carried upon crank shafts 37. The crank shafts 37, are provided with links 38, connected to the slides or plates 32, on one side, and the opposite portions of the shaft 37, are provided with crankarms 39, connected to links 40, the latter being connected to the opposite pairs of slide plates 32. The bars 31, are provided with adjustable brackets 31ᵃ, adapted to engage with the flanged projections 30ᵇ, of the upper flask-section and the projections 6ᵉ, of the pattern-plates.

As a means of moving the supporting bars 31, outwardly whereby the adjusting clips 31ᵃ, are moved to clear the flanged projections 30ᵇ, and 6ᵉ, for the insertion and removal of the flask-sections above the compressing table, the base portions of the pattern carriers are provided with cam heads 6ᶠ, to contact with a lever 41, connected to a link member 42, the link 42, being connected to a crank arm 43, on the crank shafts 37, so that when the pattern-plate 6, is swung to the position shown in Fig. 2 the cam heads 6ᶠ, have contacted with and moved the levers 41, inwardly and holding the supporting bars 31, and brackets 31ᵃ, in their outer position as indicated in Figs. 1 and 2 of the drawings.

From the foregoing description, taken in connection with the accompanying drawings, the operation and advantages of my invention will be readily understood.

Having thus described one of the embodiments of my invention, what I claim and desire to secure by Letters Patent, is,—

1. In a molding machine, a fluid actuated mold compressing table, and head and pattern-plate carriers pivotally and adjustably mounted on opposite sides of said table.

2. In a mold making machine, a pair of pattern-plate and flask-section engaging and latching members terminating at their base ends in elongated guide loops, and adjusting members mounted on said loops.

3. In a mold making machine, a frame provided with a pair of vertical bearing posts provided at their top with bearing guide slots, a pair of pattern-plate carriers, and bearing bolts extending through said carriers and said guide slots and vertically movable in the latter.

4. In a mold making machine, a pair of pattern plate and flask-section engaging and latching members terminating at their base ends in elongated guide bearing loops, bearing clips adjustably mounted in said loops, and latches carried at the free ends of said engaging and latching members.

5. In a mold making machine, a pair of pattern-plate and flask-section engaging rods pivotally and adjustably mounted at one end, a cross bar adjustably connected to and carried by the free ends of said rods, and counter-balanced latching members mounted on said cross bar.

6. In a mold making machine, a frame provided with a vertically movable mold compressing table, supporting plates slidably mounted on said frame and provided with supporting bars extending on opposite sides of said table and pattern-plate and flask-engaging and separating brackets adjustably mounted on said bars.

7. In a mold making machine, a pair of pattern-plate and flask section latching and engaging members terminating at one end in elongated guide bearing loops and provided at their opposite ends with counter-balanced latching hooks adapted to engage the free side of the pattern-plate, and flask-section engaging and clamping members adjustably mounted on said first mentioned members.

8. In a mold making machine, the combination with a frame provided with a vertically movable mold compressing table, and a pair of pattern-plate carriers pivotally mounted on one side of said table and vertically adjustable on said frame; of a head carrier pivotally and adjustably mounted on said frame on the opposite side of said table, and an auxiliary top forming flask-section adapted to be arranged beneath said head carrier.

9. In a mold making machine, a frame provided with adjustably mounted vertical bearing posts provided at their top with vertically extending bearing guide slots, pattern-plate carriers mounted on said posts, bearing bolts extending through said guide slots and through and connected to said pattern-plate carriers, bearing bolts rotatably mounted in said frame and provided with latching levers, and flexible links extending between the latter and said bearing bolts connected to said pattern carriers.

10. In a mold making machine, a pair of bearing posts provided with bearing guide slots, a pair of pattern-plate carriers mounted on said posts, bearing bolts extending through said bearing guide slots and said pattern-plate carriers and adapted to be rotated with the latter, and head carrier engaging lever members operatively connected to said bearing bolts adapted to be moved with the latter and said pattern-plate carriers.

11. In a mold making machine, a vertically movable fluid operated mold compressing table, pattern-plate and head carriers pivotally mounted on opposite sides thereof, means for vertically adjusting the pivoted portions of said carriers, means for latching said head carrier in its superposed position above said compressing table, pattern-plate and mold section engaging and separating members movably carried by said frame on opposite sides of said table, means for actuating said members with and in cooperative relation to the movements of said pattern-plate and head carriers.

12. In a mold making machine, a frame provided with a vertically movable mold compressing table and a pivoted vertically adjustable head carrier on one side of said table, a pair of pattern-plate carriers pivotally mounted on said frame at the opposite side of said table and vertically adjustable thereon, and head engaging and latching members carried by said pattern-plate carriers and adapted to be swung to and from their operative position in relation to said head carrier with the inward and outward movements, respectively, of said pattern-plate carriers.

13. In a mold making machine, the combination with a frame provided with a vertically movable mold compressing table, and head and pattern-plate carriers adjustably mounted on said frame on opposite sides of said table; of flask-section and pattern-plate engaging and separating members movably mounted on said frame on opposite sides of said table, and head engaging and latching members carried by and adapted to be swung to and from their operative positions with the inward and outward movements of said pattern-plate carriers.

14. In a mold making machine, a frame carrying a vertically movable fluid operated mold compressing table and having supporting frame extensions on opposite sides of the latter, head and pattern-plate carriers pivotally mounted on said frame on opposite sides of said table, means for vertically adjusting the pivoted portions of said head and pattern-plate carriers, pattern-plate and flask-section engaging and separating members movably mounted on said frame, and operating devices extending between the latter and the pivoted portions of said head and pattern-plate carriers.

15. In a mold making machine, a frame provided with vertically extending bearing posts and extensions on opposite sides of the latter, a vertically movable compressing table between said posts, a head carrier pivotally and adjustably connected to said bearing posts at one side of said table and adapted to be disposed in a horizontal position above the latter, a pattern-plate provided with carriers hingedly and adjustably mounted on the opposite side of said table, and means for automatically latching the free side of said head carrier when said pattern-plate has been swung into position above said table previous to the swinging in of said head carrier.

16. In a mold making machine, a pair of vertically adjustable bearing posts, a pair of pattern-plate carriers mounted on the latter, bearing bolts extending through and connected to said posts and carriers and adapted to be rotated with the movements of said carriers, rotatably mounted bearing bolts provided with latching levers adapted to be operated by the rotation of said bearing bolts, and link members extending between said bearing bolts whereby all of said bolts will simultaneously rotate and said latching levers are moved to and from their operative position with the actuation of said pattern-plate carriers.

17. In a mold making machine, the combination with a frame provided with a vertically movable mold compressing table and having vertically adjustable pivotally mounted pattern-plate and head carriers on opposite sides thereof; of pattern-plate and mold section engaging and separating members movably mounted on said frame on opposite sides of said table, means for actuating said engaging and separating members in coöperative relation to the movements of said pattern-plate and head carriers, and means carried by and movable with said pattern-plate carriers for engaging and holding the free side of said head carrier during the actuation of said mold compressing table.

18. In a mold making machine, a frame provided with a vertically movable mold compressing table and having oppositely extending extensions on opposite sides thereof, a pattern-plate adapted to be adjustably held in horizontal position on one of said extensions and pivotally and adjustably mounted at one side of said table, a head carrier pivotally and adjustably mounted on the opposite side of said table and adapted to rest on the opposite extension, a vertically adjustable flask section and pattern-plate engaging device adapted to be swung to and from said compressing table with said pattern-plate, latching means carried by the pivoted portion of said pattern-plate for latching said head carrier in its superposed position above said pattern-plate, and means operable from the pivoted portions of said pattern-plate and head carrier for engaging and separating said pattern-plate and mold section.

19. In a mold making machine, a frame having oppositely disposed extensions, a vertically movable mold compressing table carried by said frame between said extensions, a pair of pattern-plate carriers hingedly connected on bearing members adjustably carried by said frame and having a vertically movable hinged connection on said bearing members, a pattern-plate and flask section clamping device hingedly connected in a plane with the pivoted portion of said pattern-plate carriers and vertically movable therewith, a head carrier pivotally mounted on the opposite side of said table and vertically adjustable on said frame, horizontally movable pattern-plate and flask section engaging and separating members on opposite sides of said table, and means for operating said engaging and separating members with the swinging movements of said pattern-plate carriers and said head carrier.

20. In a mold making machine, a frame provided with oppositely disposed extensions, a fluid operated vertically movable mold compressing table intermediate said extensions, a pair of pattern carriers hingedly connected at one side of said table and vertically movable on said frame, a head carrier pivotally and adjustably mounted on said frame at the opposite side of said table, a drag pattern section, a pattern-plate clamping device pivotally mounted in the axial plane of the pivoted portions of said pattern-plate carriers and having a free but limited movement with respect thereto, pattern-plate and flask section engaging and separating members movably mounted on said frame and extending on opposite sides of said table, and means for moving said engaging and separating members with and in coöperative relation to the movements of said pattern-plate carriers and said head carrier.

21. In a mold making machine, a frame provided with a vertically movable mold compressing table, said frame extending on opposite sides of said table, a pair of pattern plate carriers hingedly connected at one side of said table and vertically movable thereon, bearing bolts carried by said pattern-plate carriers and provided with cam heads, a head carrier pivotally and adjustably mounted on said frame at the opposite side of said table and provided with arms having cam heads, pattern-plate and flask section engaging and separating members movably mounted on said frame and arranged on opposite sides of said table, and operating mechanism connected to said members and arranged in coöperative relation to and adapted to be operated by said cam heads carried by said bearing bolts connected to said pattern plate holders and said cam heads carried by said arms of said head carrier.

In testimony whereof I have affixed my signature in presence of two witnesses.

WILLIAM C. LANG.

Witnesses:
T. M. CRAIL,
O. C. BILLMAN.

Copies of this patent may be obtained for five cents each, by addressing the "Commissioner of Patents, Washington, D. C."